June 17, 1930.  C. F. HAUNZ  1,764,447
COMBINED ELECTRIC LIGHT AND RADIO POWER PLANT AND BATTERY CHARGING SYSTEM
Filed Nov. 10, 1927
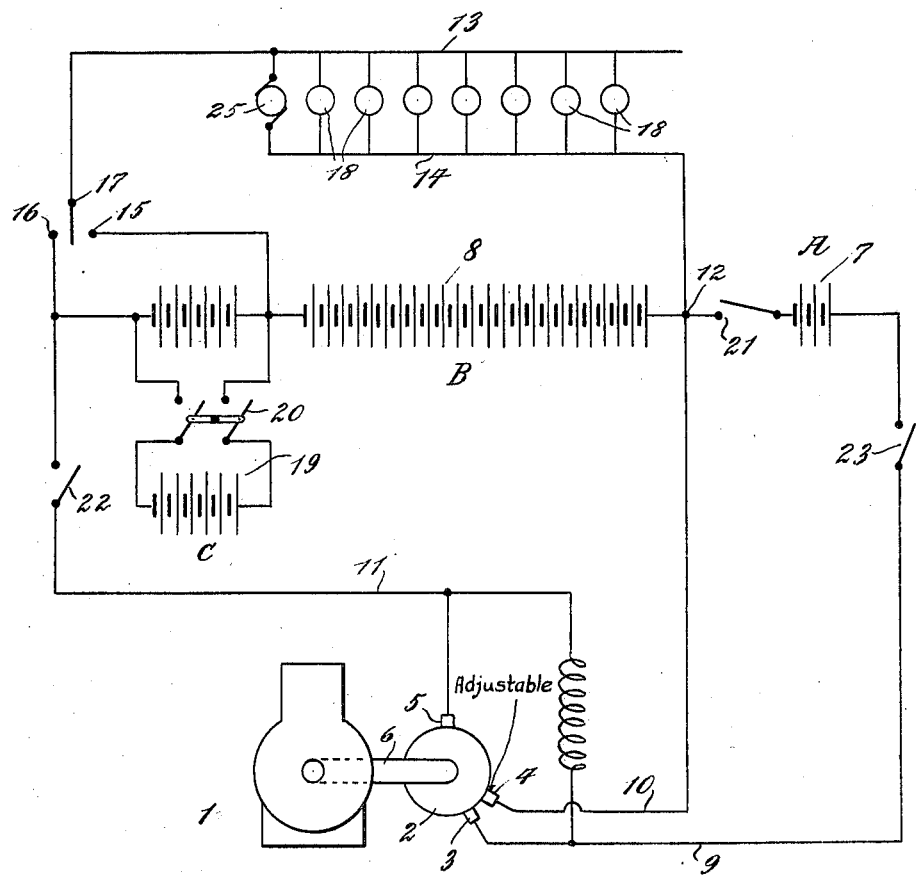
INVENTOR.
Charles F. Haunz
BY Gifford & Bull
his ATTORNEYS.

Patented June 17, 1930

1,764,447

UNITED STATES PATENT OFFICE

CHARLES F. HAUNZ, OF BATH, NEW YORK, ASSIGNOR OF ONE-HALF TO GEORGE R. BERGER, OF CHICAGO, ILLINOIS, AND ONE-HALF TO ALEXANDER McGARY, OF NEW YORK, N. Y.

COMBINED ELECTRIC-LIGHT AND RADIO POWER PLANT AND BATTERY-CHARGING SYSTEM

Application filed November 10, 1927. Serial No. 232,271.

My invention relates to a combined electric light and radio power plant and battery charging system.

In country districts where there is no electric light service there is a demand for means for supplying electric power for lighting purposes. There is also a great difficulty in such districts in keeping radio equipment in operating conditions if receiving sets are used which require storage batteries. Receiving sets having batteries are not always desirable or satisfactory, and at least they are expensive as to batteries.

I have therefore devised an arrangement whereby a farmer, or country home owner, may be provided with a limited number of electric lights as well as radio A, B and C battery service.

My invention will be better understood by the following description taken in connection with the accompanying drawing which shows a diagrammatic arrangement of the parts, showing the electrical connections for the charging of the batteries and lighting of lights or small power supply.

The outfit comprises a gasoline engine 1 or other equivalent prime mover of about 1 H. P., a shunt generator 2 having three brushes 3, 4 and 5. The generator is connected to the engine by a shaft 6 or by any other suitable means.

The A battery 7 is of low voltage preferably 6, and high current capacity, preferably about 36 A. H. The B battery 8 is a high voltage battery of low current capacity consisting of about 66 cells and having preferably about 12 A. H. capacity.

During charge the A battery 7, which usually consists of three cells, is connected across the positive brush 3 and the third brush 4 of the generator 2 by wires 9 and 10. One end of the battery 8 is connected to the third brush 4 by the wire 10, and the other end is connected to the brush 5 by wire 11. The two batteries 7 and 8 are connected in series and the wire 10 connects at the junction 12 of these two batteries.

The C battery 19, which is used to place a negative bias on the grid, consists preferably of 8 cells and is connected in parallel with 8 cells of the battery 8 during charging by means of switch 20.

During discharge or radio reception, batteries 7, 8 and 19 are disconnected into separate units by switches 20, 21, 22 and 23.

It is well known that when a battery is under charge its voltage is higher than when the battery is under discharge. I have therefore provided means whereby the lighting circuit 13, 14 is connected at the point 15 when the battery 8 is under charge and at the point 16 when the battery is under discharge. The cells between the points 15 and 16 may therefore be called regulated cells. The point 15 is about 8 cells removed from the point 16, thus providing for a difference of about 16–20 volts between the points 15 and 16. A switch 17 is provided for connecting the wire 13 of the lighting circuit to either of the points 15 or 16. The wire 13 of the lighting circuit is connected to the opposite end of the battery 8. Lamps 18 may be connected between the wires 13 and 14 in the usual manner. Also small motors 25, such as fans, vacuum cleaners, etc., may be operated from battery 8.

The switches 22 and 23 are interposed in the wires 9 and 11 for the purpose of disconnecting the generator from the batteries when the engine is stopped and for again connecting the batteries to the generator which acts as a motor to start the engine.

In operation the switches 21, 22 and 23 may be closed whereupon the generator 2 is operated as a motor by the batteries to start the engine. I prefer to have the compression relieved from the engine cylinders until the generator is up to speed. After the generator reaches a certain speed the compression is placed upon the cylinders and the engine begins operation. As soon as the speed of the engine reaches a predetermined amount it drives the generator which in turn charges the batteries 7 and 8.

The generator 2 is preferably a high voltage generator delivering normally a low current, notwithstanding the fact that the battery 7 requires a relatively high current. The charging of the battery 7 between brushes 3 and 4 is accomplished by overloading the armature wires which are only temporarily situated between these two brushes. The wires are thoroughly capable of standing this temporary overload since it is on any one wire such a very short time that it does not unduly heat it up. After the wires pass the brush 4 the current value is reduced to normal, assuming the armature to be rotating at the required speed. Also the charging rates on batteries 7 and 8 can be adjusted to any required value by changing the position of brush 4 on the commutator.

Where there is a large number of battery cells in series it is advisable to throw some of the end cells off of the consumption circuit when the cells are on charge, as above described. This means, however, that those end cells may be overcharged because they do not discharge during the charging period as do the other cells. By connecting the C battery 19 in parallel with these end cells during the charging, the end cells of the battery 8 are not substantially overcharged, since the excess goes to the cells 19.

If the lights 18 are being used while the batteries are being charged, the switch 17 should preferably be on the point 15 so that the voltage on the lamps will not be above normal value.

After the batteries have been fully charged or when it is desired to use the batteries for radio purposes the switches 20, 21, 22 and 23 will be opened and the switch 17 thrown to the point 16, whereupon the batteries are disconnected from the generator and the engine may be stopped. While the battery 8 is of relatively low capacity it will nevertheless supply a given number of lamps for a limited period of time. With farmers or small homes it is not ordinarily necessary or usual to have a large number of lights going at the same time, nor do they burn lights for any extended period of time. The capacity of battery 8 is therefore sufficient to supply several lights for a number of hours and at the same time supply the required current for B battery for radio purposes. The battery 7 may be used for any desired purpose other than a radio A battery.

Once the engine is placed in operation and the batteries are on charge no further attention is necessary until fully charged condition is reached when the switches 20, 21, 22 and 23 will be opened. The generator and engine are then stopped and there is nothing requiring attention until it becomes advisable to recharge the batteries again.

From the foregoing it will therefore be evident that I have devised a combination of elements supplying the desired electrical energy for outlying residences where there is no commercial electric power service.

Changes may be made in the details of the various devices shown and described without departing from the spirit of my invention.

I claim:

1. In combination, in a battery charging system, a high voltage generator having three brushes, a storage battery of low voltage and high current capacity connected between one main brush and the third brush and a storage battery of high voltage and low current capacity connected between the other main brush and the third brush.

2. In combination, in a battery charging system, a high voltage generator having three brushes, a storage battery of low voltage and high current capacity connected between one main brush and the third brush, a storage battery of high voltage and low current capacity connected between the other main brush and the third brush, and a power consumption circuit supplied by said second battery.

3. In combination, in a battery charging system, a high voltage generator having three brushes, a storage battery of low voltage and high current capacity connected between one main brush and the third brush, a storage battery of high voltage and low current capacity connected between the other main brush and the third brush, a consumption circuit supplied by said second battery, and means for connecting said lighting circuit at an intermediate point in said battery while the battery is charging and across all of said battery while on discharge.

4. In a battery charging and supply system, the combination of a high voltage battery, a consumption circuit supplied thereby, means for charging said battery, means for changing the connection of the consumption circuit to a point removed from one end of said battery during the charging period, and means for connecting another battery in parallel with said end cells to receive a portion of the charge.

5. In a battery charging and supply system, the combination of a high voltage battery, a consumption circuit supplied thereby, means for charging said battery, means for changing the connection of the consumption circuit to a point removed from one end of said battery during the charging period, and means for reducing normal charge rate to the end cells.

CHARLES F. HAUNZ.